April 26, 1966 S. P. DE GENNARO ETAL 3,248,083
CAMPER AND JACKING MEANS THEREFOR
Filed Jan. 21, 1965 3 Sheets-Sheet 2
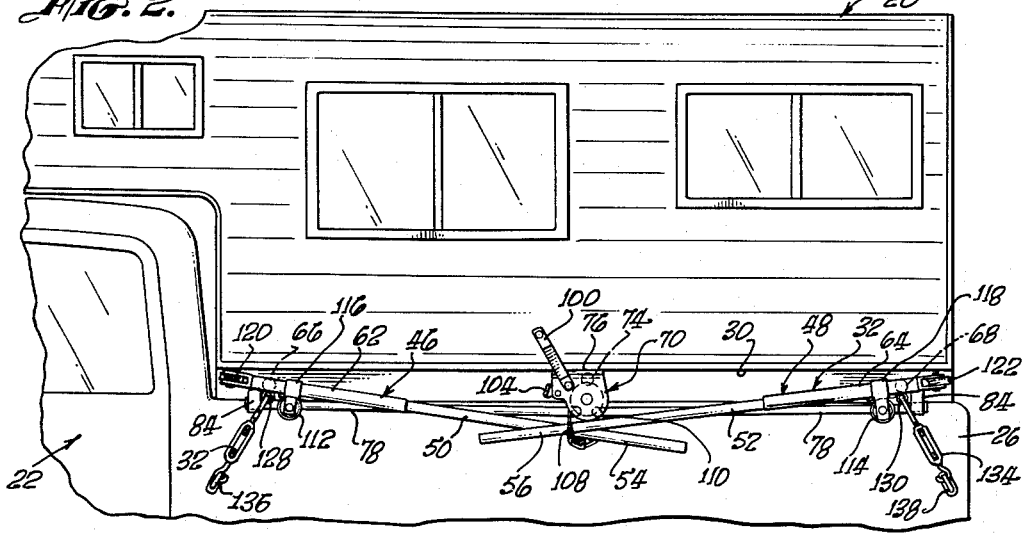
FIG. 2.
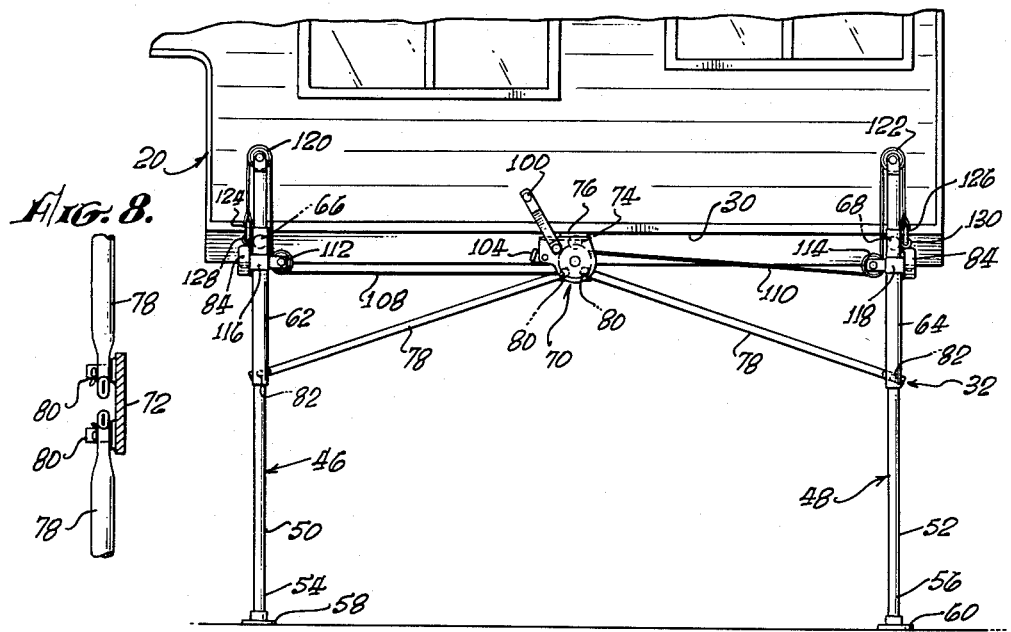
FIG. 3.
FIG. 8.
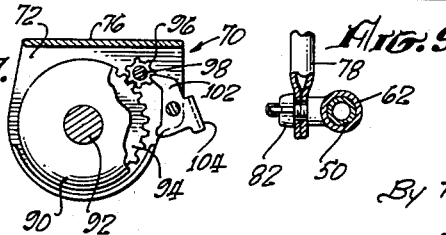
FIG. 7.
FIG. 9.
INVENTORS.
STEVE P. DE GENNARO,
STEVE J. DE GENNARO,
BY THEIR ATTORNEYS
HARRIS, KIECH, RUSSELL & KERN.

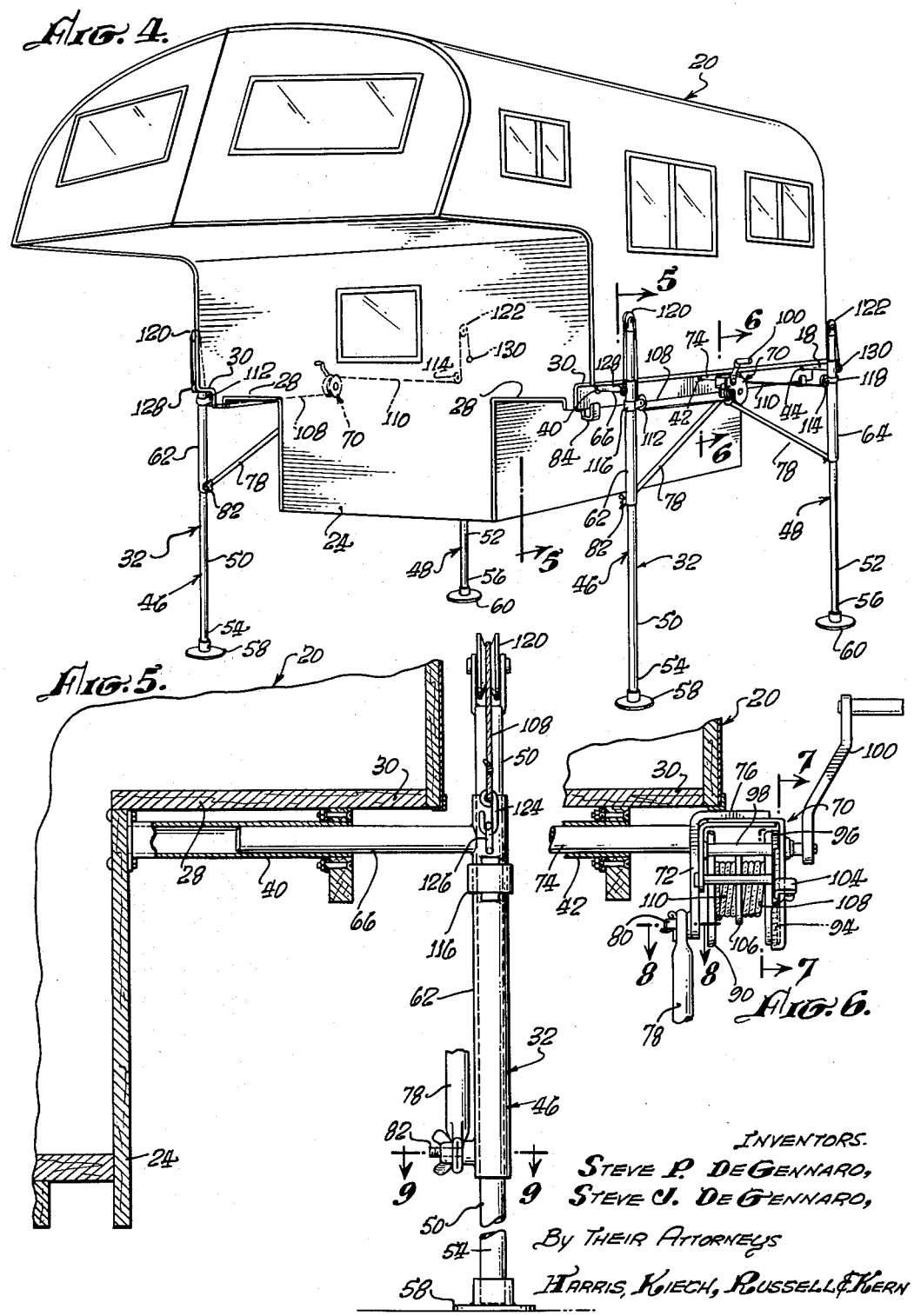

United States Patent Office 3,248,083
Patented Apr. 26, 1966

3,248,083
CAMPER AND JACKING MEANS THEREFOR
Steve P. De Gennaro, 1448 E. Forest Lane, Anaheim, Calif., and Steve J. De Gennaro, 5910 Victoria Ave., Riverside, Calif.
Filed Jan. 21, 1965, Ser. No. 426,995
15 Claims. (Cl. 254—47)

This application is a continuation-in-part of our co-pending application Serial No. 187,808, filed April 16, 1962 and now abandoned.

The present invention relates in general to campers, or camper coaches, mountable on pickup trucks, or other vehicles, and, more particularly, to jacking means, mounted on opposite sides of the camper and engageable with the ground on opposite sides thereof, for elevating the camper clear of the bed of the truck in de-mounting the camper, and for lowering the camper onto the bed of the truck in mounting the camper on the truck.

Still more particularly, the invention contemplates a camper having along its sides laterally-extending overhangs which overlie and extend laterally outwardly beyond the sides of the truck bed when the camper is mounted on the truck.

A primary object of the invention is to provide a camper jacking means which includes jacking devices respectively located on opposite sides of the camper, and which includes means mounting the jacking devices on the camper for movement upwardlly and inwardly, from extended, operative positions clear of the overhangs, into retracted, inoperative positions under the overhangs. With this construction, the jacking means is completely out of the way under the overhangs of the camper when the jacking means is not in use, which is an important feature of the invention.

Another primary object of the invention is to provide means connecting the jacking devices to the sides of the bed of the truck, when the jacking devices are in their retracted positions, for securing the camper to the truck.

A more specific object of the invention is to provide a camper and jacking means combination which includes: laterally-extending front, intermediate and rear sockets on each side of the camper under the corresponding overhang; front and rear jacks on each side of the camper, the front and rear jacks respectively including front and rear supports having lower ends engageable with the ground and respectively including front and rear sleeves slidable longitudinally of the front and rear supports; the front and rear sleeves respectively including laterally-extendnig front and rear shafts respectively inserted or plugged into the front and rear sockets; winches on the respective sides of the camper intermediate the front and rear jacks and respectively having laterally-extending intermediate shafts plugged into the intermediate sockets; front and rear cable guides on the front and rear sleeves and on the front and rear support adjacent the upper ends thereof; and cables for interconnecting the winches and the corresponding front and rear sleeves, and trainable around the front and rear cable guides on the corresponding front and rear sleeves and supports, for raising and lowering the front and rear sleeves relative to the front and rear supports, upon actuation of the corresponding winches, so as to raise and lower the camper.

An important object of the invention is to provide a camper and jacking means combination of the foregoing character wherein the shafts mentioned are slidable laterally of the camper in their respective sockets to provide for lateral movement of the front and rear jacks and the winches between retracted positions under the overhangs and extended positions in which the jacks are clear of the overhangs, and wherein the front and rear jacks are pivotable upwardly, about the axes of the corresponding shafts and sockets, into completely retracted positions under the overhangs.

Another object of the invention is to provide means for connecting the sleeves on the jacks to the pickup truck when the jacks are in their retracted positions so as to secure the camper to the truck.

Still another object of the invention is to provide braces for interconnecting the winches and the corresponding front and rear sleeves to brace the front and rear jacks and to prevent rotation of the winches about the axes of the intermediate shafts when the jacks are in their extended positions clear of the overhangs. A related object is to provide the winches with upper surfaces engageable with the under sides of the overhangs to prevent rotation of the winches about the axes of the intermediate shafts when the winches are in their extended positions and when they are in their retracted positions under the overhangs.

Another object is to provide means for securing the braces to the camper when the front and rear jacks are in their retracted positions.

An important object of the invention is to provide means on the cables on each side of the camper for connecting them to the corresponding front and rear jacks so that the winches may be utilized as means for pivoting the corresponding front and rear jacks upwardly into and for securing them in their retracted positions.

The foregoing objects, advantages, features and results of the present invention, together with various other objects, advantages, features and results thereof which will be evident to those skilled in the camper art in the light of this disclosure, may be achieved with the exemplary embodiment of the invention described in detail hereinafter and illustrated in the accompanying drawings, in which:

FIG. 2 is an enlarged, fragmentary side view of the pickup truck and camper with the jacking means of the invention in its retracted condition;

FIG. 3 is a side view of the camper and jacking means with the jacking means in its extended position to support the camper, and with the truck removed;

FIG. 4 is a perspective view corresponding to FIG. 3;

Figure 1:
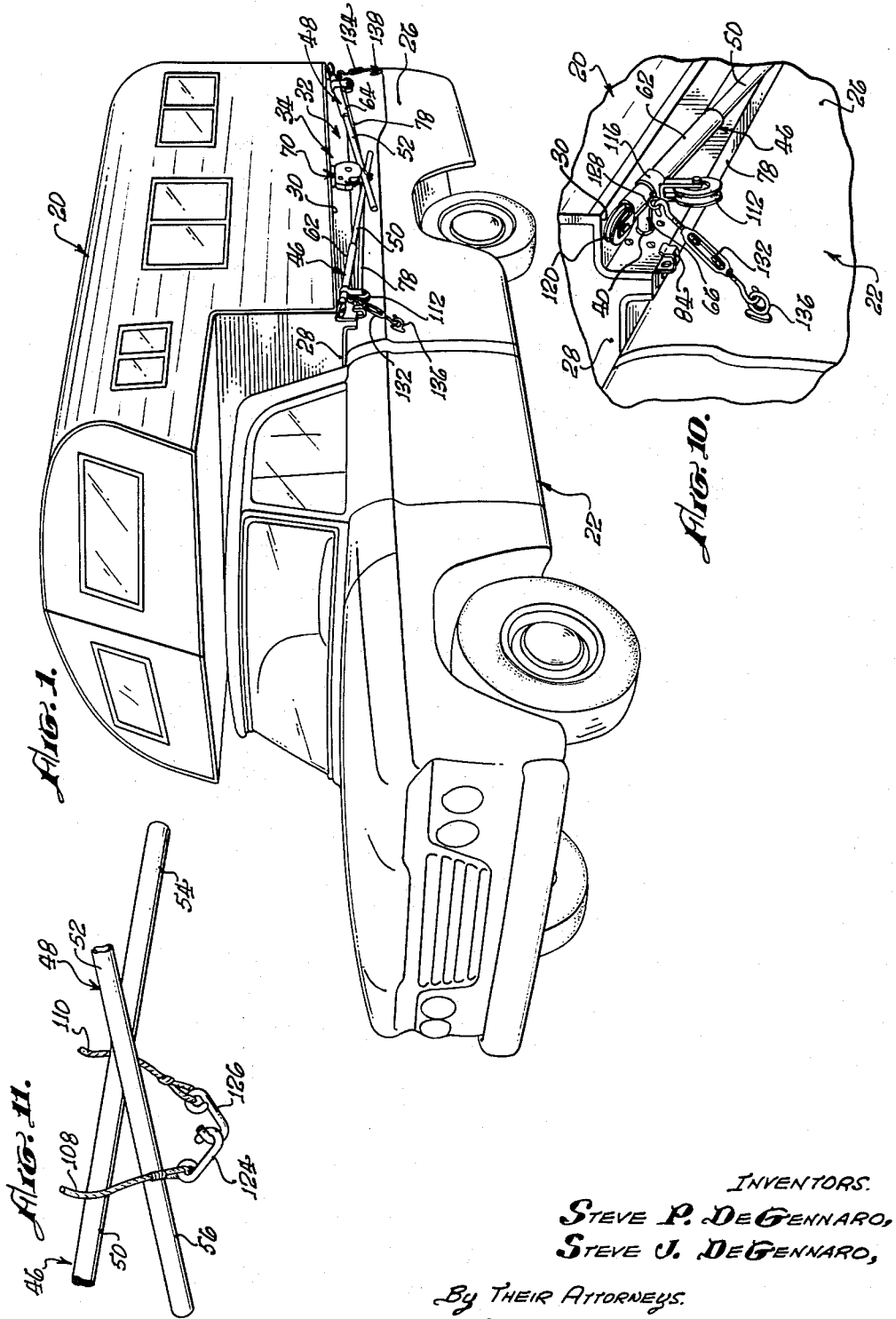
FIG. 1 is a perspective view showing a pickup truck having mounted thereon a camper equipped with the jacking means of the invention, such jacking means being shown in its retracted position.

FIGS. 5 and 6 are enlarged, fragmentary sectional views respectively taken along the irregular arrowed lines 5—5 and 6—6 of FIG. 4;

FIGS. 7 and 8 are fragmentary sectional views respectively taken along the arrowed lines 7—7 and 8—8 of FIG. 6;

FIG. 9 is a fragmentary sectional view taken along the arrowed line 9—9 of FIG. 5;

FIG. 10 is an enlarged, fragmentary perspective view similar to a portion of FIG. 1; and FIG. 11 is an enlarged, fragmentary perspective view illustrating means for retracting the jacking means of the invention.

In the drawings, the numeral 20 designates a camper or camper coach mountable on a pickup truck 22, or similar vehicle. As is conventional, the camper 20 has a lower section 24, FIG. 4, of reduced width which fits into the bed of the truck 22 between the sides 26 thereof and which rests on the truck bed. As is also conventional, the camper 22 has along its sides laterally-extending overhangs 28 which project outwardly over the sides 26 of the truck bed.

In accordance with the invention, the camper 20 is provided along its sides with additional laterally-extending overhangs 30, located outwardly of the overhangs 28, respectively adapted to receive thereunder jacking devices 32 constituting a jacking means 34 of the invention for raising and lowering the camper in mounting it on and removing it from the truck 22. The two jacking devices 32 are identical so that, for convenience, only one of them is disclosed in detail.

Each jacking device 32 includes laterally-extending front, intermediate and rear pivot elements in the form of sockets 40, 42 and 44, FIGS. 4 to 6, mounted on the corresponding side of the camper 20 and having open outer ends under the corresponding outer overhang 30. Each jacking device 32 also comprises front and rear jacks 46 and 48 respectively including front and rear supports 50 and 52 having lower ends 54 and 56 engageable with the ground and adapted to be equipped with removable feet 58 and 60 to provide increased bearing surfaces if necessary. The front and rear jacks 46 and 48 also include front and rear sleeves 62 and 64 respectively slidable longitudinally of the front and rear supports 50 and 52. These sleeves respectively include laterally-extending front and rear pivot elements in the form of shafts 66 and 68 axially inserted into the respective front and rear sockets 40 and 44. As will be discussed in more detail hereinafter, the shafts 66 and 68 are pivotable within the sockets 40 and 44, and are movable axially thereof, to permit upward pivoting and inward movement of the front and rear jacks 46 and 48 into retracted positions under the corresponding overhang 30.

Each jacking device 32 also comprises a winch 70 having a frame 72 which includes a laterally-extending intermediate pivot element in the form of a shaft 74 axially inserted or plugged into the corresponding intermediate socket 42. The intermediate shaft 74 is movable axially of the corresponding socket 42 to permit inward movement of the corresponding winch 70 into a retracted position under the corresponding overhang 30. Rotation of each winch 70 about the axis of the corresponding socket 42 is prevented by engagement of a flat upper surface 76 of the frame 72 with the under side of the corresponding overhang 30, as illustrated in FIG. 6, which shows the winch in its extended position. When the front and rear jacks 46 and 48 and the winch 70 of each jacking device 32 are in their extended positions, as shown in FIGS. 3 and 4, the winch and the jacks are interconnected by diagonal braces 78 which also serve to prevent rotation of the winch 70 about the axis of its socket 42, and to brace the front and rear jacks 46 and 48. The braces 78 are connected to the frame 72 of the winch 70 by pivots 80, FIGS. 3 and 8, and are detachably connectible to the lower ends of the front and rear sleeves 62 and 64 by fasteners 82. When each jacking device 32 is in its retracted position, as shown in FIG. 2, for example, the fasteners 82 are disconnected from the braces 78, and the corresponding ends of the braces are placed in supporting clips 84 on the corresponding side of the camper 20 under the corresponding overhang 30.

Each winch 70 includes a rotatable reel 90 mounted on a shaft 92 extending transversely of the camper 20 and carried by the corresponding winch frame 72, as shown in FIGS. 6 and 7. As also shown in these figures, fixed to the outer end of the reel 90 is a driven gear 94 meshed with a smaller, driving gear 96 on a shaft 98 carried by the frame 72 and equipped with a removable handle 100. The driving gear 96 also acts as a ratchet wheel and is engageable by a pawl 102 pivotally mounted on the winch frame 72 and suitably spring biased into engagement with the driving gear. The pawl 102 is provided with a thumb lever 104 for releasing it from the driving gear 96. The pawl 102 is so oriented that when the winch 70 is actuated in a direction to elevate the camper 20, as will be described hereinafter, it rides over the teeth on the gear 96. In order to lower the camper, it is necessary to disengage the pawl 102 from the gear 96 by means of the thumb lever 104.

Although each winch 70 is shown as manually operable by means of the corresponding handle 100, it will be understood that the winches 70 may be power operated if desired.

As best shown in FIG. 6 of the drawings, the reel 90 is divided into two parts by an intermediate partition 106. The inner ends of the front and rear cables 108 and 110 are secured to the reel 90 within the respective parts thereof and are adapted to be wound on such parts. The front and rear cables 108 and 110 are adapted to be trained around front and rear guide pulleys 112 and 114 respectively carried by collars 116 and 118 on the front and rear sleeves 62 and 64. The collars 116 and 118 are fixed against axial movement relative to the corresponding sleeves 62 and 64, but are rotatable about such sleeves to permit the guide pulleys 112 and 114 to align themselves with the cables 108 and 110 properly, and to permit such guide pulleys to hang downwardly clear of the under sides of the overhangs 30 when the jacking devices 32 are retracted. This is shown in FIGS. 1, 2 and 10 of the drawings.

From the guide pulleys 112 and 114, the cables 108 and 110 are adapted to extend upwardly and over front and rear guide pulleys 120 and 122 respectively mounted on the upper ends of the front and rear supports 50 and 52. The outer ends of the cables 108 and 110 are equipped with hooks 124 and 126 engageable with eyes 128 and 130 on the respective sleeves 62 and 64 substantially opposite the shafts 66 and 68 thereon.

When the winches 70 are actuated with the cables 108 and 110 trained around the guide pulleys 112, 114, 120 and 122 and with the hooks 124 and 126 in engagement with the eyes 128 and 130, the camper 20 may be raised and lowered in removing it from or mounting it on the truck 22. As will be apparent, the cables 108 and 110 move the sleeves 62 and 64 upwardly or downwardly on the supports 50 and 52, thereby moving the camper 20 upwardly or downwardly correspondingly.

As previously indicated, the front and rear jacks 46 and 48 and the winch 70 of each jacking device 32 are movable laterally inwardly into retracted positions under the corresponding overhang 30, the front and rear jacks also being pivotable upwardly under such overhang, as shown in FIGS. 1, 2 and 10. Under such conditions, the cables 108 and 110 are disconnected from the eyes 128 and 130 and are disengaged from the pulleys 112, 114, 120 and 122, and the hooks 124 and 126 are interengaged around the lower ends 54 and 56 of the supports 50 and 52, as shown in FIGS. 2 and 11. Under such conditions, the winches 70 may be actuated to pivot the front and rear jacks 46 and 48 upwardly into their retracted positions, and to secure them in such positions by means of the pawls 102.

With the jacking devices 32 retracted, the camper 20 is secured to the truck 22 by means of front and rear turnbuckles 132 and 134 on each side. The turnbuckles 132 and 134 are provided at their ends with hooks respectively engaging the eyes 128 and 130 on the sleeves 62 and 64 and eyes 136 and 138 on the sides of the truck bed. By tightening the turnbuckles, the camper 20 is secured to the truck 22 through the jacking devices 32, whereby the jacking devices perform a dual function.

*Operation*

For convenience in considering the operation of the jacking means 34 of the invention, it will be assumed that the camper 20 is secured to the truck 22 with the jacking means 34 retracted, as shown in FIGS. 1, 2 and 10, and that the camper is to be elevated clear of the bed of the truck so that the truck may be driven away, as shown in FIGS. 3 and 4 of the drawings.

To accomplish the foregoing, the turnbuckles 132 and 134 are first loosened sufficiently to permit their removal, preferably utilizing the winch handle 100 for this purpose. The front and rear jacks 46 and 48 and the winches 70 are then pulled outwardly into their extended positions, and the winches are actuated to lower the jacks.

At the same time, the braces 78 are disengaged from the clips 84. The jacks 46 and 48 are then moved into their upright positions manually, by moving the supports 50 and 52 upwardly relative to the sleeves 62 and 64 as required. If necessary, the feet 58 and 60 are placed on the lower ends 54 and 56 of the supports 50 and 52. The braces 78 are then attached to the sleeves 62 and 64 by the fasteners 82. To complete the operation of setting up the jacking means 34, the cables 108 and 110 are threaded around the guide pulleys 112, 114, 120 and 122 and the hooks 124 and 126 are engaged with the eyes 128 and 130.

The foregoing completed, the winches 70 are actuated to elevate the camper 20 clear of the bed of the truck 22. This may be accomplished by two persons actuating the winches 70 simultaneously, or one person may actuate the two winches sequentially in a step-by-step manner. Alternatively, power operated winches may be used.

Once the camper 20 has been elevated sufficiently, the truck 22 may be driven away, leaving the camper supported by the jacking means 34.

Mounting the camper 20 on the truck 22 requires essentially a reversal of the foregoing procedure so that a detailed description is not necessary.

It might be pointed out that when the jacking devices 32 are in their retracted positions, the guide pulleys 120 and 122 on the supports 50 and 52 may be rotated into positions such that they clear the under sides of the overhangs 30, as shown in FIG. 10, for example. Similarly, the collars 116 and 118 may rotate relative to the sleeves 62 and 64 to permit the guide pulleys 112 and 114 to hang downwardly clear of the overhangs 30.

Although an exemplary embodiment of the invention has been described herein for purposes of illustration, it will be understood that various changes, modifications and substitutions may be incorporated in such embodiment without departing from the spirit of the invention as defined by the claims which follow:

We claim:
1. In a camper and jacking means therefor, the combination of:
 (a) laterally-extending front, intermediate and rear sockets on each side of said camper;
 (b) front and rear jacks on each side of said camper;
 (c) said front and rear jacks respectively including front and rear supports having lower ends engageable with the ground and respectively including front and rear sleeves slidable longitudinally of said front and rear supports;
 (d) said front and rear sleeves respectively including laterally-extending front and rear shafts respectively plugged into said front and rear sockets;
 (e) winches on the respective sides of said camper intermediate said front and rear jacks and respectively having laterally-extending intermediate shafts plugged into said intermediate sockets;
 (f) cable guides on said supports adjacent the upper ends thereof; and
 (g) cables for interconnecting said winches and the corresponding front and rear sleeves and trainable over said cable guides on the corersponding front and rear supports.

2. In a camper and jacking means therefor, the combination of:
 (a) laterally-extending front, intermediate and rear sockets on each side of said camper;
 (b) front and rear jacks on each side of said camper;
 (c) said front and rear jacks respectively including front and rear supports having lower end engageable with the ground and respectively including front and rear sleeves slidable longitudinally of said front and rear supports;
 (d) said front and rear sleeves respectively including laterally-extending front and rear shafts respectively plugged into said front and rear sockets;
 (e) winches on the respective sides of said camper interemdiate said front and rear jacks and respectively including laterally-extending intermediate shafts plugged into said intermediate sockets;
 (f) cable guides on said supports adjacent the upper ends thereof;
 (g) cables for interconnecting said winches and the corresponding front and rear sleeves and trainable over said cable guides on the corresponding front and rear supports; and
 (h) braces for interconnecting said winches and the corresponding front and rear sleeves.

3. In a camper having laterally-extending overhangs along its sides and jacking means for said camper, the combination of:
 (a) laterally-extending front, intermediate and rear sockets on each side of said camper under the corresponding overhang;
 (b) front and rear jacks on each side of said camper;
 (c) said front and rear jacks respectively including front and rear supports having lower ends engageable with the ground and respectively including front and rear sleeves slidable longitudinally of said front and rear supports;
 (d) said front and rear sleeves respectively including laterally-extending front and rear shafts respectively plugged into said front and rear sockets;
 (e) winches on the respective sides of said camper intermediate said front and rear jacks and respectively having laterally-extending intermediate shafts plugged into said intermediate sockets;
 (f) cable guides on said supports adjacent the upper ends thereof;
 (g) cables for interconnecting said winches and the corresponding front and rear sleeves and trainable over said cable guides on the corresponding front and rear supports; and
 (h) said shafts being slidable laterally of said camper in their respective sockets to provide for lateral movement of said front and rear jacks and said winches between retracted positions under said overhangs and extended positions.

4. In a camper having laterally-extending overhangs along its sides and jacking means for said camper, the combination of:
 (a) laterally-extending front, intermediate and rear sockets on each side of said camper under the corresponding overhang;
 (b) front and rear jacks on each side of said camper;
 (c) said front and rear jacks respectively including front and rear supports having lower ends engageable with the ground and respectively including front and rear sleeves slidable longitudinally of said front and rear supports;
 (d) said front and rear sleeves respectively including laterally-extending front and rear shafts respectively plugged into said front and rear sockets;
 (e) winches on the respective sides of said camper intermediate said front and rear jacks and respectively having laterally-extending intermediate shafts plugged into said intermediate sockets;
 (f) cable guides on said supports adjacent the upper ends thereof;
 (g) cables for interconnecting said winches and the corresponding front and rear sleeves and trainable over said cable guides on the corresponding front and rear supports;
 (h) said shafts being slidable laterally of said camper in their respective sockets to provide for lateral movement of said jacks and winches between retracted positions under said overhangs and extended positions; and
 (i) said winches having upper surfaces engageable with the under sides of said overhangs to prevent rotation of said winches about the axes of said intermediate shafts when said winches are in their retracted positions.

5. In a camper having laterally-extending overhangs along its sides and jacking means for said camper, the combination of:
  (a) laterally-extending front, intermediate and rear sockets on each side of said camper under the corresponding overhang;
  (b) front and rear jacks on each side of said camper;
  (c) said front and rear jacks respectively including front and rear supports having lower ends engageable with the ground and respectively including front and rear sleeves slidable longitudinally of said front and rear supports;
  (d) said front and rear sleeves respectively including laterally-extending front and rear shafts respectively plugged into said front and rear sockets;
  (e) winches on the respective sides of said camper intermediate said front and rear jacks and respectively having laterally-extending intermediate shafts plugged into said intermediate sockets;
  (f) cable guides on said supports adjacent the upper ends thereof;
  (g) cables for interconnecting said winches and the corresponding front and rear sleeves and trainable over said cable guides on the corresponding front and rear supports;
  (h) braces for interconnecting said winches and the corresponding front and rear sleeves; and
  (i) said shafts being slidable laterally of said camper in their respective sockets to provide for lateral movement of said jacks and winches between retracted positions under said overhangs and extended positions.

6. In a camper and jacking means therefor, the combination of:
  (a) laterally-extending front, intermediate and rear sockets on each side of said camper;
  (b) front and rear jacks on each side of said camper;
  (c) said front and rear jacks respectively including front and rear supports having lower ends engageable with the ground and respectively including front and rear sleeves slidable longitudinally of said front and rear supports;
  (d) said front and rear sleeves respectively including laterally-extending front and rear shafts respectively plugged into said front and rear sockets;
  (e) winches on the respective sides of said camper intermediate said front and rear jacks and respectively having laterally-extending intermediate shafts plugged into said intermediate sockets;
  (f) cable guides on said supports adjacent the upper ends thereof, respectively, and on said sleeves, respectively; and
  (g) cables for interconnecting said winches and the corresponding front and rear sleeves and trainable around said cable guides on the corresponding front and rear supports and sleeves.

7. In a camper and jacking means therefor, the combination of:
  (a) front and rear jacks on each side of said camper;
  (b) said front and rear jacks respectively including front and rear supports having lower ends engageable with the ground and respectively including front and rear sleeves slidable longitudinally of said front and rear supports;
  (c) laterally-extending front and rear pivot means respectively pivotally connecting said front and rear sleeves to said camper;
  (d) winches mounted on the respective sides of said camper intermediate said front and rear jacks;
  (e) cable guides on said supports adjacent the upper ends thereof;
  (f) cables for interconnecting said winches and the corresponding front and rear sleeves and trainable over said cable guides on the corresponding front and rear supports;
  (g) said front and rear jacks being pivotable upwardly into retracted positions about the axes of the corresponding front and rear pivot means;
  (h) means on said cables on each side of said camper for connecting them to the corresponding front and rear jacks; and
  (i) whereby said winches serve as means for pivoting the corresponding front and rear jacks upwardly into their retracted positions.

8. In a camper and jacking means therefor, the combination of:
  (a) laterally-extending front, intermediate and rear sockets on each side of said camper;
  (b) front and rear jacks on each side of said camper;
  (c) said front and rear jacks respectively including front and rear supports having lower ends engageable with the ground and respectively including front and rear sleeves slidable longitudinally of said front and rear supports;
  (d) said front and rear sleeves respectively including laterally-extending front and rear shafts respectively axially plugged into said front and rear sockets;
  (e) winches on the respective sides of said camper intermediate said front and rear jacks and respectively having laterally-extending intermediate shafts axially plugged into said intermediate sockets;
  (f) cable guides on said supports adjacent the upper ends thereof;
  (g) cables for interconnecting said winches and the corresponding front and rear sleeves and trainable over said cable guides on the corresponding front and rear supports;
  (h) said front and rear jacks being pivotable upwardly into retracted positions about the axes of the corresponding front and rear sockets;
  (i) means on said cables on each side of said camper for connecting them to the corresponding front and rear jacks; and
  (j) whereby said winches serve as means for pivoting the corresponding front and rear jacks upwardly into their retracted positions.

9. In a camper mountable on a vehicle and jacking means for said camper, the combination of:
  (a) front and rear jacks on each side of said camper;
  (b) said front and rear jacks respectively including front and rear supports having lower ends engageable with the ground and respectively including front and rear sleeves slidable longitudinally of said front and rear supports;
  (c) laterally-extending front and rear pivot means respectively pivotally connecting said front and rear sleeves to said camper;
  (d) winches mounted on the respective sides of said camper intermediate said front and rear jacks;
  (e) cable guides on said supports adjacent the upper ends thereof;
  (f) cables for interconnecting said winches and the corresponding front and rear sleeves and trainable over said cable guides on the corresponding front and rear supports;
  (g) said front and rear jacks being pivotable upwardly into retracted positions about the axes of the corresponding front and rear pivot means; and
  (h) means for connecting said sleeves to the vehicle when said jacks are in their retracted positions so as to secure said camper to the vehicle.

10. In a camper and jacking means therefor, the combination of:
  (a) front and rear jacks on each side of said camper;
  (b) said front and rear jacks respectively including front and rear supports having lower ends engageable with the ground and respectively including front and rear sleeves slidable longitudinally of said front and rear supports;
(c) laterally-extending front and rear pivot means respectively pivotally connecting said front and rear sleeves to said camper;
(d) winches mounted on the respective sides of said camper intermediate said front and rear jacks;
(e) cable guides on said supports adjacent the upper ends thereof;
(f) cables for interconnecting said winches and the corresponding front and rear sleeves and trainable over said cable guides on the corresponding front and rear supports;
(g) said front and rear jacks being pivotable upwardly into retracted positions about the axes of the corresponding front and rear pivot means;
(h) means for securing said front and rear jacks in their retracted positions;
(i) braces connected to said winches and connectible to the corresponding front and rear sleeves; and
(j) means for securing said braces to said camper when said front and rear jacks are in their retracted positions.

11. In a camper and jacking means therefor, the combination of:
(a) front and rear jacks on each side of said camper;
(b) said front and rear jacks respectively including front and rear supports having lower ends engageable with the ground and respectively including front sleeves slidable longitudinally of said front and rear supports;
(c) laterally-extending front and rear pivot means respectively pivotally connecting said front and rear sleeves to said camper;
(d) winches mounted on the respective sides of said camper intermediate said front and rear jacks;
(e) cable guides on said supports adjacent the upper ends thereof;
(f) cables for interconnecting said winches and the corresponding front and rear sleeves and trainable over said cable guides on the corresponding front and rear supports;
(g) said front and rear jacks being pivotable upwardly into retracted positions about the axes of the corresponding front and rear pivot means;
(h) means on said cables on each side of said camper for connecting them to the corresponding front and rear jacks;
(i) whereby said winches serve as means for pivoting the corresponding front and rear jacks upwardly into their retracted positions;
(j) braces connected to said winches and connectible to the corresponding front and rear sleeves; and
(k) means for securing said braces to said camper when said front and rear jacks are in their retracted positions.

12. In a camper having laterally-extending overhangs along its sides and jacking means for said camper, the combination of:
(a) laterally-extending front, intermediate and rear sockets on each side of said camper under the corresponding overhang;
(b) front and rear jacks on each side of said camper;
(c) said front and rear jacks respectively including front and rear supports having lower ends engageable with the ground and respectively including front and rear sleeves slidable longitudinally of said front and rear supports;
(d) said front and rear sleeves respectively including laterally-extending front and rear shafts respectively plugged into said front and rear sockets;
(e) winches on the respective sides of said camper intermediate said front and rear jacks and respectively having laterally-extending intermediate shafts plugged into said intermediate sockets;
(f) cable guides on said supports adjacent the upper ends thereof;
(g) cables for interconnecting said winches and the corresponding front and rear sleeves and trainable over said cable guides on the corresponding front and rear supports;
(h) said shafts being slidable laterally of said camper in their respective sockets to provide for lateral movement of said jacks and winches between retracted positions under said overhangs and extended positions;
(i) said winches having upper surfaces engageable with the under sides of said overhangs to prevent rotation of said winches about the axes of said intermediate shafts when said winches are in their retracted positions; and
(j) braces for interconnecting said winches and the corresponding front and rear sleeves to prevent rotation of said winches about the axes of said intermediate shafts when said winches are in their extended positions.

13. In a camper and jacking means therefor, the combination of:
(a) laterally-extending front, intermediate and rear pivot elements on each side of said camper;
(b) front and rear jacks on each side of said camper;
(c) said front and rear jacks respectively including front and rear supports having lower ends engageable with the ground and respectively including front and rear sleeves slidable longitudinally of said front and rear supports;
(d) said front and rear sleeves respectively including laterally-extending front and rear pivot elements respectively engaging said front and rear pivot elements on said camper;
(e) winches on the respective sides of said camper intermediate said front and rear jacks and respectively having laterally-extending intermediate pivot elements engaging said intermediate pivot elements on said camper;
(f) cable guides on said supports adjacent the upper ends thereof; and
(g) cables for interconnecting said winches and the corresponding front and rear sleeves and trainable over said cable guides on the corresponding front and rear supports.

14. In a camper and jacking means therefor, the combination of:
(a) front and rear jacks on each side of said camper;
(b) said front and rear jacks respectively including front and rear supports having lower ends engageable with the ground and respectively including front and rear sleeves slidable longitudinally of said front and rear supports;
(c) laterally-extending front and rear pivot means respectively pivotally connecting said front and rear sleeves to said camper;
(d) winches mounted on the respective sides of said camper intermediate said front and rear jacks;
(e) cable guides on said supports adjacent the uper ends thereof;
(f) cables for interconnecting said winches and the corresponding front and rear sleeves and trainable over said cable guides on the corresponding front and rear supports;
(g) said front and rear jacks being pivotable upwardly into retracted positions about the axes of the corresponding front and rear pivot means; and
(h) means for securing said front and rear jacks in their retracted positions.

15. In a camper and jacking means therefor, the combination of:
(a) front and rear jacks on each side of said camper;
(b) said front and rear jacks respectively including front and rear supports having lower ends engageable with the ground and respectively including front and rear sleeves slidable longitudinally of said front and rear supports;
(c) laterally-extending front and rear pivot means respectively pivotally connecting said front and rear sleeves to said camper;
(d) actuating means, including winch means mounted on said camper and connected to said front and rear sleeves, for moving said front and rear sleeves longitudinally of said front and rear supports;
(e) said actuating means including cable guides on said front and rear supports and including cables connected to the corresponding front and rear sleeves and trained over said cable guides on the corresponding front and rear supports;
(f) said front and rear jacks being pivotable upwardly into retracted positions about the axes of the corresponding front and rear pivot means; and
(g) means for securing said front and rear jacks in their retracted positions.

References Cited by the Examiner
UNITED STATES PATENTS 2,958,538  11/1960  Norris et al. _____ 214—515
3,073,467  1/1963  Parks _____ 214—515

WILLIAM FELDMAN, Primary Examiner.

MILTON S. MEHR, Examiner.